United States Patent [19]

Odaka et al.

[11] Patent Number: 5,029,022

[45] Date of Patent: Jul. 2, 1991

[54] METHOD OF STORING DATA ON RECORDING TAPE

[75] Inventors: Kentaro Odaka; Yoshizumi Inazawa, both of Tokyo, Japan; Brian A. Milthorp, Bristol, United Kingdom; Bruce A. Thompson, Fort Collins, Colo.

[73] Assignees: Hewlett-Packard Limited, England; Sony Corporation, Japan

[21] Appl. No.: 294,077

[22] Filed: Jan. 5, 1989

[30] Foreign Application Priority Data

Jan. 8, 1988 [GB] United Kingdom ................ 8800349

[51] Int. Cl.⁵ .......................... G11B 5/09; G11B 27/02
[52] U.S. Cl. .......................................... 360/48; 360/13
[58] Field of Search .............................. 360/48, 13, 32

[56] References Cited

U.S. PATENT DOCUMENTS 4,677,501 6/1987 Saltzman et al. ................... 360/137
4,860,125 8/1989 van der Meer ...................... 360/13
4,893,199 1/1990 Okada ................................. 360/32

Primary Examiner—Aristotelis M. Psitos
Assistant Examiner—Varsha V. Sheladia

[57] ABSTRACT

A method is disclosed for effecting update-in-place of data that has been recorded on tape in oblique tracks using a helical-scan recording technique. The data to be updated is recorded in a block of M tracks lying between first and second continuum each at least of N tracks where N is the worst-case number of tracks required to achieve head/track alignment. The block of M tracks comprises a first series of at least N tracks, a second series of tracks containing the data, and a third series of at least P tracks. When updating the data, the block is rewritten as a whole in a single continuum with the first track of the block being written within a distance of P tracks from the last track of the first continuum.

8 Claims, 6 Drawing Sheets

METHOD OF STORING DATA ON RECORDING TAPE

BACKGROUND OF THE INVENTION

The present invention related to a method of storing data on recording tape, the method employing helical scan recording in which data is written in oblique tracks. In particular, but not exclusively, the invention relates to a method of updating tape usage data held in a log area of the tape, this updating being effected at the end of each session of use of the tape.

Where data is stored by longitudinal recording on a tape, it is known to provide a log area for storing the tape usage data and to repeatedly update this data by rewriting the log area. The process is facilitated by the fact that the tape is generally recorded with formatting keys (usually fixed-frequency tones) dividing up the data, these keys either being pre-recorded or being written at the same time as the data. The log area will therefore be delimited by formatting keys and is generally read/written immediately following a particular key.

In the field of helical scan recording, a number of problems exist that are not present in longitudinal recording. In particular, it normally takes a number of tracks for the helical-scan recording head to become synchronized to any new sequence of tracks so that discontinuities in track pattern, such as will generally occasioned by over-writing old data with new, cause particular difficulties.

One object of the present invention is to provide a method for updating specified data tracks in tape written using helical scanning.

SUMMARY OF THE INVENTION

According to one aspect of the present invention, there is provided a method of storing data on a recording tape and of subsequently updating that data, said method employing helical scan recording in which data is written in oblique tracks and a head tracking alignment technique is used that enables tracking alignment to be achieved after a maximum number of N tracks; the method comprising the steps of:

(a) writing a first and second continuum of tracks each containing more than N tracks in number and being separated from each other along the tape by a number of tracks Q, the last track of said first continuum being identifiable by data recorded in that continuum beyond the first N tracks thereof, (b) subsequently writing data to tape in a block of M tracks made up of a first series of tracks greater than N in number, a second series of tracks containing said data, and a third series of blanking tracks, the operation of writing said block involving the steps of reading said first continuum to identify the last track thereof, and writing said block as a continuum of tracks starting at a location positioned beyond said last track of the first continuum by up to P tracks, said third series of tracks being at least P in number, (c) repeating step (b) each time it is desired to update the data held in said block, the values of N and P being predetermined and the maximum value of M being set by the value of the quantity $(Q-P)$, and step (a) being such that the inequality $Q > (N+2P)$ is satisfied.

This method of update-in-place takes account of the uncertainties introduced by the discontinuities generally caused by the updating process in helical scan recording. The said third series of tracks has a length that ensures that any previous data recorded in the said second series of tracks will always be overwritten by a new block.

This update-in-place method can be used for updating a log area storing tape usage data; however, the method is also more generally applicable.

Preferably, said first and second continuums of tracks are written in a single continuous series together with Q intervening tracks.

Advantageously said data recorded in said first continuum to enable identification of the last track thereof, are numbers recorded in at least some of said tracks and progressing according to a predetermined sequence.

Preferably, the number of tracks M in said block is less than Q by at least 2P whereby a distance of at least P tracks is present between the end of said block and the start of said second continuum of tracks.

As well as the general problem of effecting update-in-place with helical scan recording that is tackled by the aforesaid aspect of the invention, the particular helical-scan implementation adopted may include aspects which are less than ideal in the context of storing tape usage data in a log area of the tape. The general implementation of interest herein is one based on a track format similar to that employed in the so-called DAT Conference Standard (referenced later in the present text); more particularly, in the implementation of interest, each track is divided into a main area for storing user data and at least one sub area for storing auxiliary information relating to said user data. Generally with implementations of this form, one or more levels of error correcting codes are used to secure the integrity of the user data; however, the auxiliary information is normally only subject to a simple parity check. This fact, coupled with the practice in longitudinal recording where the log area is effectively treated as user data (as opposed to auxiliary information such as provided by formatting keys), suggests that in the helical-scan implementation of interest, tape-usage data should be stored in the data area of one or more tracks.

However, according to a second aspect of the present invention, this approach to storing tape-usage data is not followed. Instead, the tape usage information is stored in its totality in the sub area of each of a plurality of tracks. This multiple recording of the tape usage data ensures a high probability that the data will be recoverable and, indeed, guards against certain tape-wear type defects which might not be overcome by recording the data once in a data area and protecting it with an error correcting code. Furthermore, the use of the sub areas for tape usage data avoids certain complexities of introducing data into a user-data channel from a different source.

BRIEF DESCRIPTION OF THE DRAWINGS

A data storage method and apparatus embodying the invention and for storing and updating computer data on tape, will now be particularly described, by way of non-limiting example, with reference to the accompanying diagrammatic drawings, in which.

DETAILED DESCRIPTION OF THE PREFERRED EMBODIMENT

The data storage apparatus now to be described utilizes a helical scan technique for storing data in oblique tracks on a recording tape in a format similar to that used for the storage of PCM audio data according to the DAT Conference Standard (June 1987, Electronic Industries Association of Japan, Tokyo, Japan). The present apparatus is, however, adapted for storing computer data rather than digitized audio information.

Figure 1:
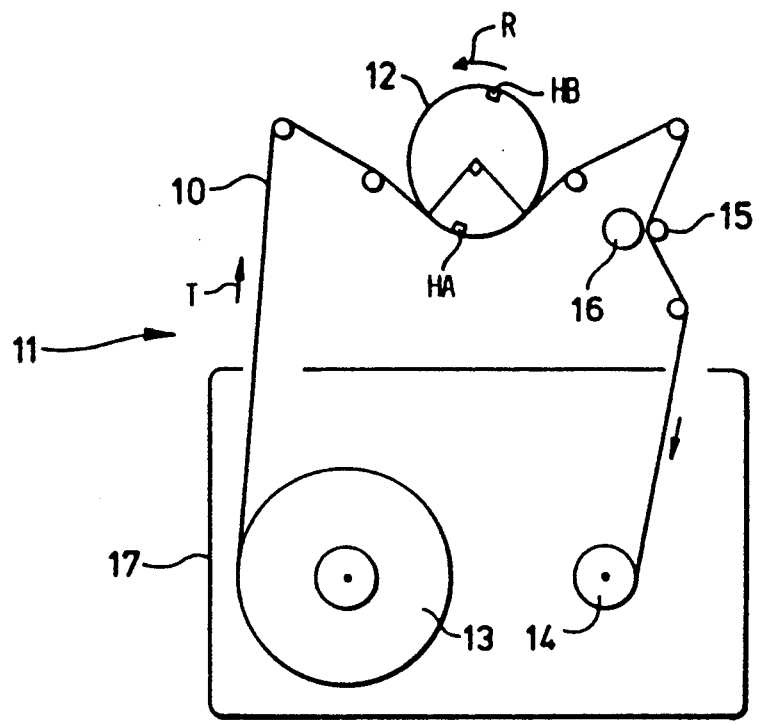
FIG. 1 is a diagrammatic representation of two data tracks recorded on tape using helical scanning.
Figure 2:
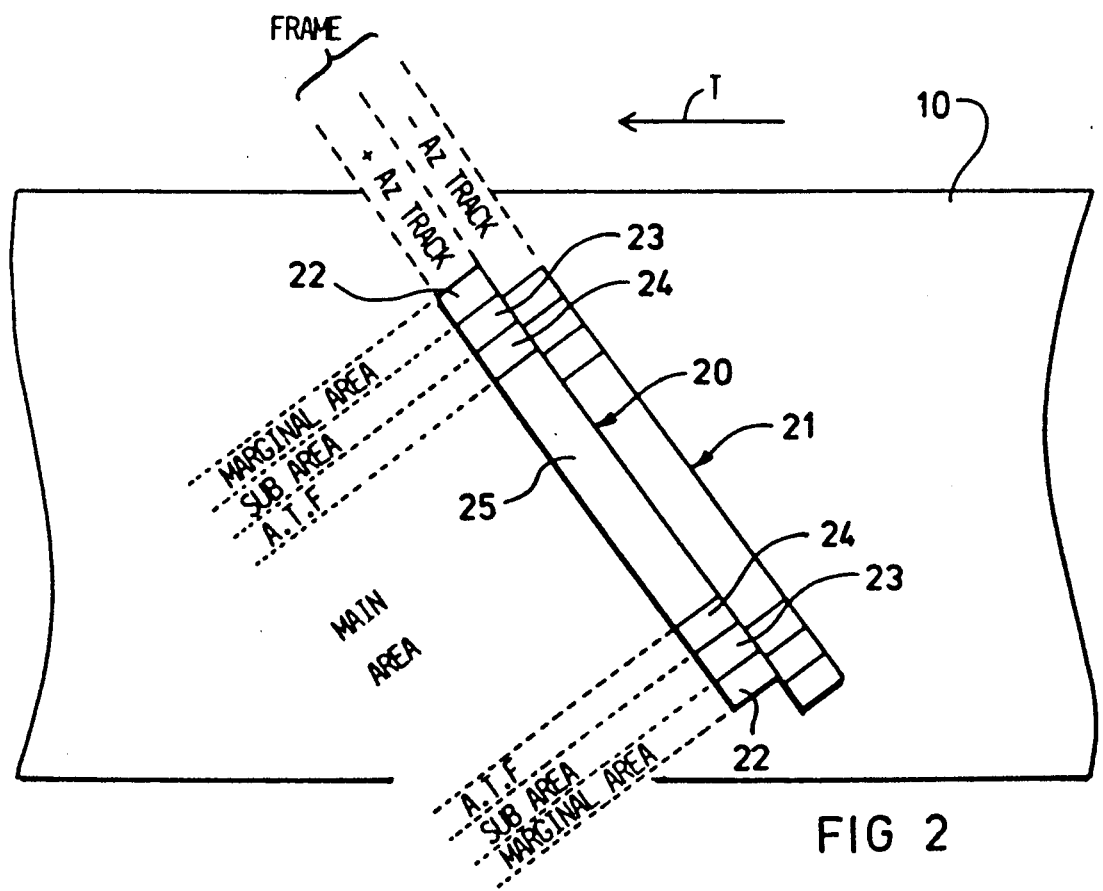
FIG. 2 illustrates the basic format of each track as arranged to be written by the present invention.

FIG. 1 shows the basic layout of a helical-scan tape deck 11 in which tape 10 from a tape-cartridge 17 passes at a predetermined angle across a rotary head drum 12 with a wrap angle of 90°. In operation, the tape 10 is moved in the direction indicated by arrow T from a supply reel 13 to a take-up reel 14 by rotation of a capstan 15 against which the tape is pressed by a pinch roller 16; at the same time, the head drum is rotated in the sense indicated by arrow R. The head drum 12 houses two read/write heads HA, HB angularly spaced by 180°. In known manner, these heads HA, HB are arranged to write overlapping oblique tracks 20, 21 respectively across the tape 10 as shown in FIG. 2. The track written by head HA has a positive azimuth while that written by head HB has a negative azimuth. Each pair of positive and negative azimuth tracks, 20, 21 constitutes a frame.

The basic format of each track as arranged to be written by the present apparatus is illustrated in FIG. 2. Each track comprises two marginal areas 22, two sub areas 23, two ATF (Automatic Track Following) areas 24, and a main area 25. The ATF areas 24 provide signals enabling the heads HA, HB to accurately follow the tracks in known manner. The main area 25 is used primarily to store the data provided to the apparatus (user data) although certain auxiliary information is also stored in this area; the sub areas 23 are primarily used to store further auxiliary information. The items of auxiliary information stored in the main and sub areas are known as sub codes and relate for example, to the logical organisation of the user data, its mapping onto the tape, certain recording parameters (such as format identity, tape parameters etc), and tape usage history.

A more detailed description of the main area 25 and sub areas 23 will now be given including details as to block size that are compatible with the aforementioned DAT Conference Standard.

Figure 3:
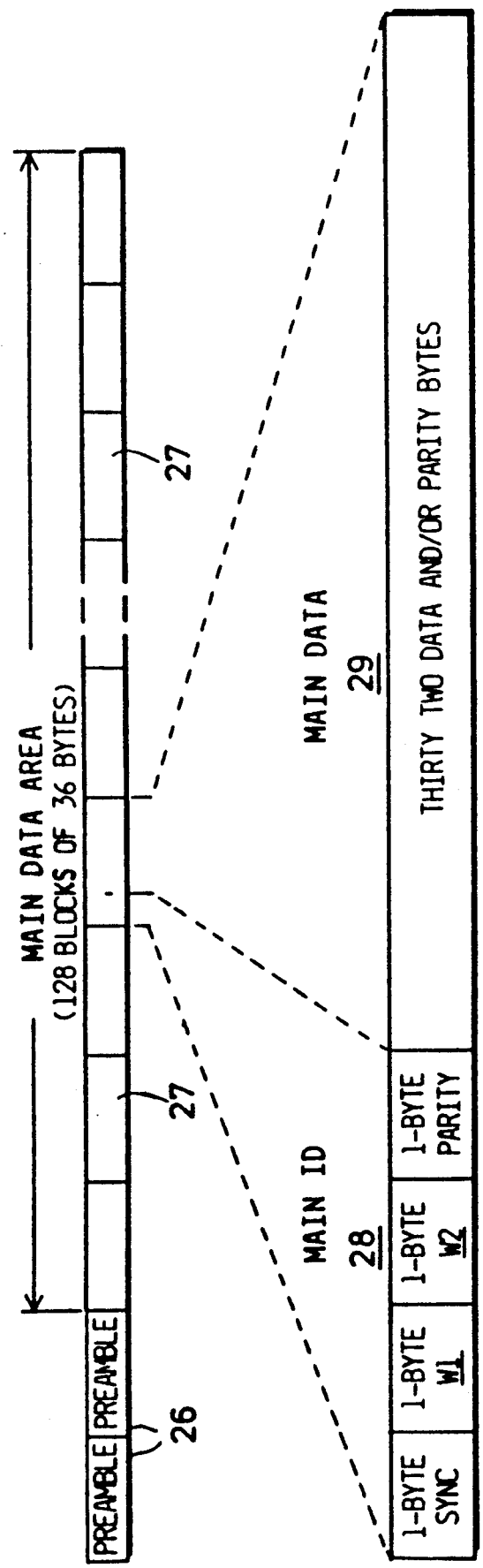
FIG. 3 is a diagrammatic representation of the format of a main data area of a data track.

The data format of the main area 25 of a track is illustrated in FIG. 3. The main area is composed of 130 blocks each thirty six bytes long. The first two blocks 26 are preambles which contain timing data patterns to facilitate timing synchronisation on playback. The remaining 128 blocks 27 make up the 'Main Data Area'. Each block 27 of the Main Data Area comprises a four-byte 'Main ID' region 28 and a thirty-two byte 'Main Data' region 29, the compositions of which are shown in the lower part of FIG. 3.

The Main ID region 28 is composed of a sync byte, two information-containing bytes W1, W2 and a parity byte. Byte W2 is used for storing information relating to the block as a whole (type and address) while byte W1 is used for storing sub codes.

The Main Data region 29 of each block 27 is composed of thirty two bytes generally constituted by user-data and/or user-data parity. However, it is also possible to store sub codes in the Main Data region if desired.

Figure 4:
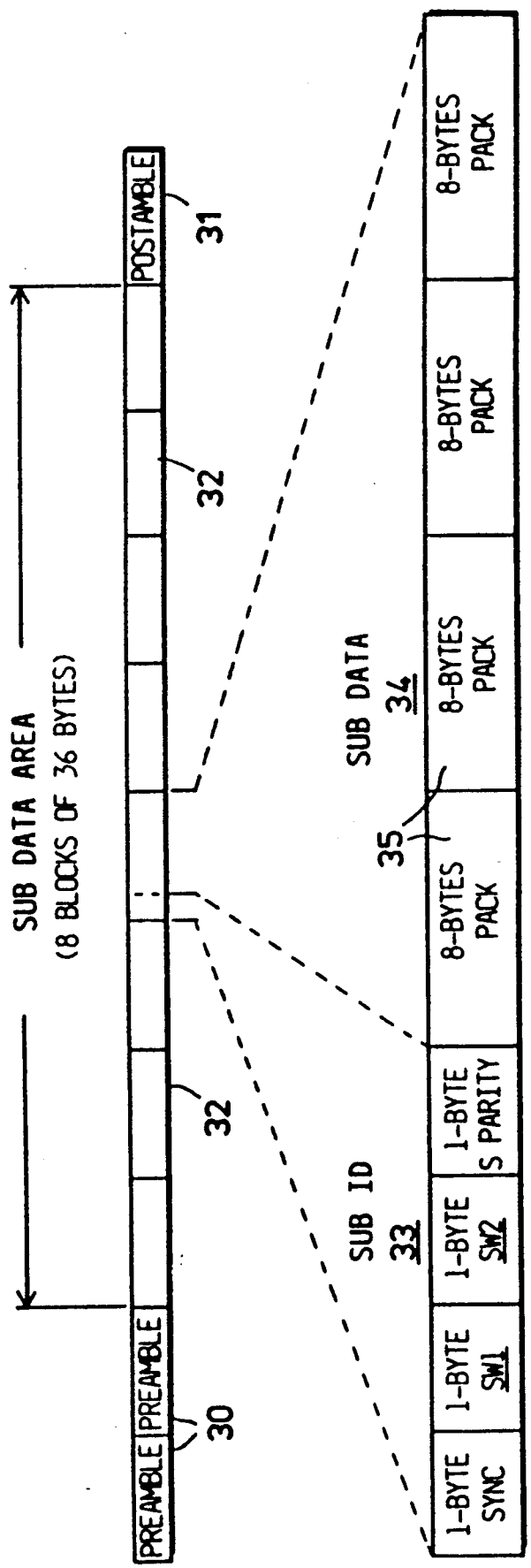
FIG. 4 is a diagrammatic representation of the format of a sub data area of a data track.

The data format of each sub area 23 of a track is illustrated in FIG. 4. The sub area is composed of eleven blocks each thirty-six bytes long. The first two blocks 30 are preambles while the last block 31 is a post-amble. The remaining eight blocks 32 make up the "Sub Data Area". Each block 32 comprises a four-byte 'Sub ID' region 33 and a thirty-two byte 'Sub Data' region 34, the compositions of which are shown in the lower part of FIG. 4.

The Sub ID region 33 is composed of a sync byte, two information-containing bytes SW1, SW2 and a parity byte. Byte SW2 is used for storing information relating to the block as a whole (type and address) and the arrangement of the Sub Data region 34. Byte SW1 is used for storing sub codes.

The Sub Data region 34 of each block 32 is composed of thirty two bytes arranged into four eight-byte "packs" 35. These packs 35 are used for storing sub codes with the types of sub code stored being indicated by a pack-type label that occupies the first half byte of each pack. The fourth pack 35 of every second block is used to store parity check data both for the first three packs of that block and the four packs of the preceding block.

In summary, user data is stored in the Main Data regions 29 of the Main Data Area blocks 27 of each track while sub codes can be stored both in the Sub ID and Sub Data regions 33, 34 of Sub Data Area blocks 32 and in the Main ID and Main Data regions 28, 29 of Main Data Area blocks 27.

For the purposes of the present description, the sub codes of interest are an Area ID sub code used to identify the tape area to which particular tracks belong, an absolute frame count sub code used to number each frame from a beginning-of-recording (BOR) position, and a number of sub codes used for storing tape usage data.

The area ID sub code is a four-bit code stored in byte SW1 of the Sub ID region 33 of every even Sub Data Area block 32 in a track, starting with the first block. The tape areas identified by this sub code will be described later on with reference to FIG. 5.

The absolute frame count sub code is, for example, a three-byte code stored in the third pack 35 of the Sub Data region 34 of every block in the Sub Data Areas of a track.

The tape usage sub codes contain data indicative of, for example, the number of frames containing user-data read and written both during the life of the tape to date and during the last session of use, and the number of tape usage sessions to date (one session being typically delimited by the loading and unloading of a tape cartridge). These tape usage sub codes are, for example, stored in the first two packs 35 of the Sub Data region 34 of the blocks in the Sub Data Areas of certain specific tracks, these tracks being those that make up a log area of a system area of the tape (these tape areas will be described more fully below). The tape usage sub codes are arranged to be repeated in their totality in the Sub Area of each track in the log area. However, the tape sub codes may not be repeated in every Sub Data Area block as they may require more than one block to store them. Thus, for example, the tape usage sub codes may occupy four packs in total in which case half the tape usage sub codes are repeated every even block and the other half are repeated every odd block.

It will be helpful to consider next the general organisation of frames along the tape implemented by the apparatus. Thus, referring to FIG. 5, the tape can be seen to be organised into three main areas, namely a lead-in area 36, a data area 37 and an end-of-data (EOD) area 38. User data is recorded in the frames of the data area 37. The lead-in area 36 includes the afore-mentioned system area 82 for storing tape usage data, and a reference area 81 that precedes the system area 82 and serves as a reference for updating the latter. The system area 82 is followed by the data area 37. The Area ID sub code enables the reference area 81, system area 82, data area 37 and EOD area 38 to be distinguished from one another upon playback.

In the present apparatus, the frames of the data area are arranged in groups 39 each of a fixed number of frames (for example, twenty two); optionally, these groups are separated from each other by one or more amble frames of predetermined content. The organisation of user data into such groups has no relation to the logical structure of the user data and information relating to this structure (for example, record and file marks) is stored in an index that terminates the user-data in a group (the index actually occupies user data space within the group). Information regarding logical structure may also be stored in sub codes as may other group-dependent items of information.

Figure 5:
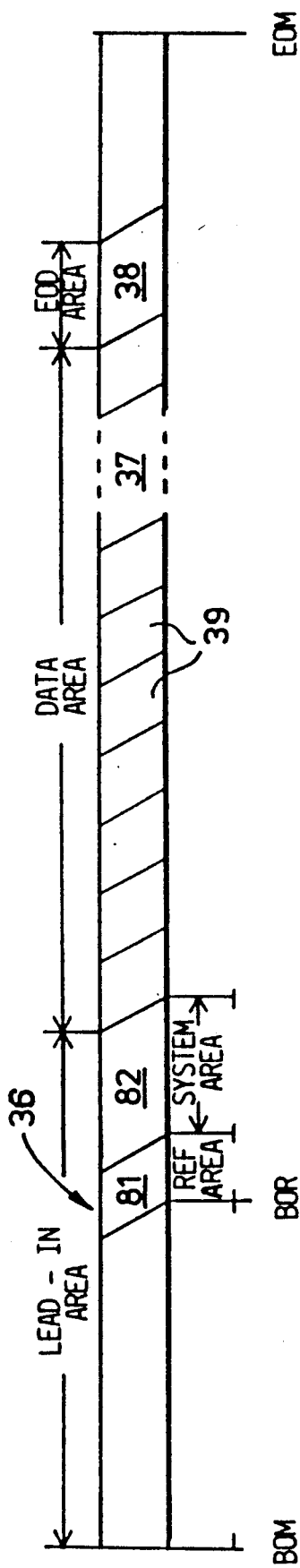
FIG. 5 is a diagram showing the different areas along the length of a recording tape used in the apparatus.

The ends of the tape are referenced in FIG. 5 BOM (for Beginning of Media) and EOM (for End Of Media); these positions may correspond to the ends of the tape media as a whole or to the conjunction of the recording media with leader tape sections. A further tape location BOR is also referenced in FIG. 5, this being a Beginning of Recording position which marks the start of the storage of useful data.

FIG. 5 is a block diagram of the data storage apparatus in its entirety including the tape deck 11 already described in part with reference to FIG. 1. In addition to the tape deck, the apparatus includes an interface unit 40 for interfacing the apparatus with a computer (not shown); a group processor 44 and a frame data processor 41 for processing user-data and sub codes into and out of Main Data Area and Sub Data Area blocks 27 and 32; a signal organiser 42 for composing/decomposing the signals for writing/reading a track and for appropriately switching the two heads HA, HB; and a system controller 43 for controlling the operation of the apparatus in response to commands received from a computer via the interface unit 40. Each of the main component units of the apparatus will be further described below.

The data storage apparatus is arranged to respond to commands from a computer to load/unload a tape, to store a data record and other logical segmentation marks, to search for a selected record using the segmentation marks, and to read back the next record.

The interface unit 40 is arranged to receive the commands from the computer and to manage the transfer of data records and logical data segmentation marks between the apparatus and computer. Upon receiving a command for the computer, the unit 40 passes it on to the system controller 43 which, in due course will send a response back to the computer via the unit 40 indicating compliance or otherwise with the original command. Once the apparatus has been set up by the system controller 43 in response to a command from the computer to store or read data, then the interface unit 40 will also control the passage of records and segmentation marks between the computer and the group processor 44.

During data storage the group processor 74 is arranged to segment the user-data provided to it in the form of data records into data packages each corresponding to a group's worth of data. This segmentation is effected without regard to the logical organisation of the data (that is, how it is divided into records). Information regarding the logical segmentation of the data (record divisions, file marks) is stored in an index which is generated by the processor 74 and which, as already mentioned, forms the last portion of data making up a group. The processor 44 also generates certain sub codes whose contents are group-dependent or concern the logical segmentation of data. To facilitate these tasks and the transfer of data to and from the processor 44, the latter is provided with a large buffer 74 which is arranged to hold several (for example, three) group's worth of data.

Once a group, including its index, has been assembled, it is transferred a frame at a time to the frame data processor 41. Conceptually there is no need for the frame data processor 41 to be aware of the grouping of frames as the group processor 44 could simply pass it a frame's worth of user data at a time together with the appropriate sub codes. However, in order to speed the transfer of data between the processors 44 and 41, it is advantageous for the frame data processor 41 to be managed in terms of groups for receiving data from the processor 44—in other words, during recording, the processor 41 is told by the group processor 44 when a group is ready for processing after which the processor 41 accesses the frames of the group autonomously from the buffer 74.

As previously mentioned, it may be desirable to insert one or more amble frames between groups of frames recorded on the tape. This can be done by arranging for the frame data processor 41 to generate such amble frames either upon instruction from the group processor 44 or automatically at the end of a group if the processor 41 is aware of group structure.

When data is being read from tape, the group processor 44 is arranged to receive user-data on a frame-by-frame basis, the data being written into the buffer 74 in such a manner as to build up a group. The group processor 44 can then access the group index to recover information on the logical organisation (record structure, file marks) of the user-data in the group. Using this information the group processor can pass the requested record or segmentation mark to the computer via the interface unit 40.

To facilitate the assembly of frame data back into a group's worth of data, each frame can be tagged with an in-group sequence number when the frame is written to tape. This in-group number can be provided as a sub code that, for example, is included at the head of the main data region of the first block in the Main Data Area of each track of a frame. The subcode is used on playback to determine where the related frame data is placed in the buffer 74 when passed to the group processor 44.

The frame data processor 41 functionally comprises a Main-Data-Area (MDA) processor 65, a Sub-Data-Area (SDA) processor 66, and a sub code unit 67 with an associated electronic memory 68 for tape usage data (in practice, these functional elements may be constituted by a single microprocessor running appropriate processes).

The sub code unit 67 is arranged to provide subcodes to the processors 65 and 66 as required during recording and to receive and distribute sub codes from the processors 65, 66 during playback. Dependent on their information contents, sub codes may be generated/required by the group processor 44 or the system controller; the Area ID sub code is, for example, determined by/used by the controller 43. In the case of non-varying sub codes such as certain recording parameters, the sub codes may be permanently stored in the unit 67. Furthermore, frame-dependent sub codes such as absolute frame number, may conveniently be generated by the sub code unit 67 itself.

With regard to the tape usage sub codes, these are read off from the system area of a tape upon first loading and stored by the unit 67 in the memory 68. During a tape usage session, the tape usage data held in the memory 68 is updated by the unit 67 as appropriate on the basis of inputs received from the processors 44, 65, 66 and the controller 43; thus if a record is kept of the number of user-data frames read/written (either directly or in terms of the number of groups read and written), then this data must be continually updated by the unit 67 as a result of inputs from the processor 65 (or possibly the processor 44 if groups are counted). At the end of a tape usage session, the contents of the memory 68 are stored to tape in the Sub Areas of each track within the Log Area of the tape system area, the latter being rewritten at the end of each session of usage. The multiple storage of the tape usage sub codes within the log area together with associated parity information, ensures a very high probability that the tape usage sub codes can be read back from the tape even in the presence of tape defects or other similar degradations.

The MDA processor 65 is arranged to process a frame's worth of user data at a time together with any relevant sub codes. Thus during recording, the processor 65 receives a frame's worth of user-data from the group processor 44 together with sub codes from the unit 67. On receiving the user-data the processor 65 interleaves the data, and calculates error correcting codes, before assembling the resultant data and sub codes to output the Main-Data-Area blocks for the two tracks making up a frame. In fact before assembling the user data with the sub codes, scrambling (randomising) of the data may be effected to ensure a consistent RF envelope independent of the data contents of a track signal.

During playback, the processor 65 effects a reverse process on the two sets of Main-Data-Area blocks associated with the same frame. Unscrambled, error-corrected and de-interleaved user data is passed to the group processor 44 and sub codes are separated off and distributed by the unit 67 to the processor 44 or system controller 43 as required.

The operation of the SDA processor 66 is similar to the processor 65 except that it operates on the sub codes associated with the sub-data-areas of a track, composing and decomposing these sub codes into and from Sub-Data-Area blocks.

The signal organiser 42 comprises a formatter/separator unit 53 which during recording (data writing) is arranged to assemble Main-Data-Area blocks and Sub-Data-Area blocks provided by the frame data processor 41 together with ATF signals from an ATF circuit 49, to form the signal to be recorded on each successive track. The necessary pre-amble and post-amble patterns are also inserted into the track signals where necessary by the unit 53. Timing signals for coordinating the operation of the unit 53 with rotation of the heads HA, HB are provided by a timing generator 54 fed with the output of a pulse generator 50 responsive to head drum rotation. The track signals output on line 55 from the unit 53 are passed alternately to head HA and head HB via a head switch 56, respective head drive amplifiers 57, and record/playback switches 58 set to their record positions. The head switch 56 is operated by appropriate timed signals from the timing generator 54.

During playback (data reading) the track signals alternately generated by the heads HA and HB are fed via the record/playback switches 58 (now set in their playback positions), respective read amplifiers 59, a second head switch 60, and a clock recovery circuit 61, to the input of the formatter/separator unit 53. The operation of the head switch 60 is controlled in the same manner as that of the head switch 56. The unit 53 now serves to separate off the ATF signals and feed them to the circuit 49, and to pass the Main-Data-Area blocks and Sub-Data-Area blocks to the frame data processor 41. Clock signals are also passed to the processor 41 from the clock recovery circuit 61.

The switches 58 are controlled by the system controller 43.

The tape deck 11 comprises four servos, namely a capstan servo 45 for controlling the rotation of the capstan 15, first and second reel servos 46, 47 for controlling rotation of the reels 14, 15 respectively, and a drum servo 48 for controlling the rotation of the head drum 12. Each servo includes a motor M and a rotation detector D both coupled to the element controlled by the servo. Associated with the reel servos 46, 47 are means 51 for sensing the beginning-of-media (BOM) and end-of-media (EOM); these means 51 may for example be based on motor current sensing, as the motor current of whichever reel is being driven to wind in tape (dependant on the direction of tape travel) will increase significantly upon stalling of the motor at BOM/EOM.

The tape deck 11 further comprises the automatic track following circuit 49 for generating ATF signals for recordal on tape during recording of data. During playback, the ATF circuit 49 is responsive to the ATF track signal read from tape to provide an adjustment signal to the capstan servo 45 such that the heads HA, HB are properly aligned with the tracks recorded on the tape. The tape deck 11 also includes the pulse generator 50 for generating timing pulses synchronised to the rotation of the heads HA, HB.

The operation of the tape deck 11 is controlled by a deck controller 52 which is connected to the servos 45 to 48 and to the BOM/EOM sensing means 51. The controller 52 is operable to cause the servos to advance the tape, (either at normal speed or at high speed) through any required distance. This control is effected either by energising the servos for a time interval appropriate to the tape speed set, or by feedback of tape displacement information from one or more of the rotation detectors D associated with the servos.

The deck controller (52) is itself governed by control signals issued by the system controller 43. The deck controller 52 is arranged to output to the controller 43 signals indicative of BOM and EOM being reached.

The system controller 43 serves both to manage high-level interaction between the computer and storage apparatus and to coordinate the functioning of the other units of the storage apparatus in carrying out the basic operations of Load/Record/Search/Playback/Unload requested by the computer. In this latter respect, the controller 43 serves to coordinate the operation of the deck 11 with the data processing portion of the apparatus.

In controlling the tape deck 11, the system controller can request the deck controller 52 to move the tape at the normal read/write speed (Normal) or to move the tape forwards or backwards at high speed, that is, Fast Forward (F.FWD) or Fast Rewind (F.RWD). The deck controller 52 is arranged to report arrival of BOM or EOM back to the system controller 43.

Figure 7:
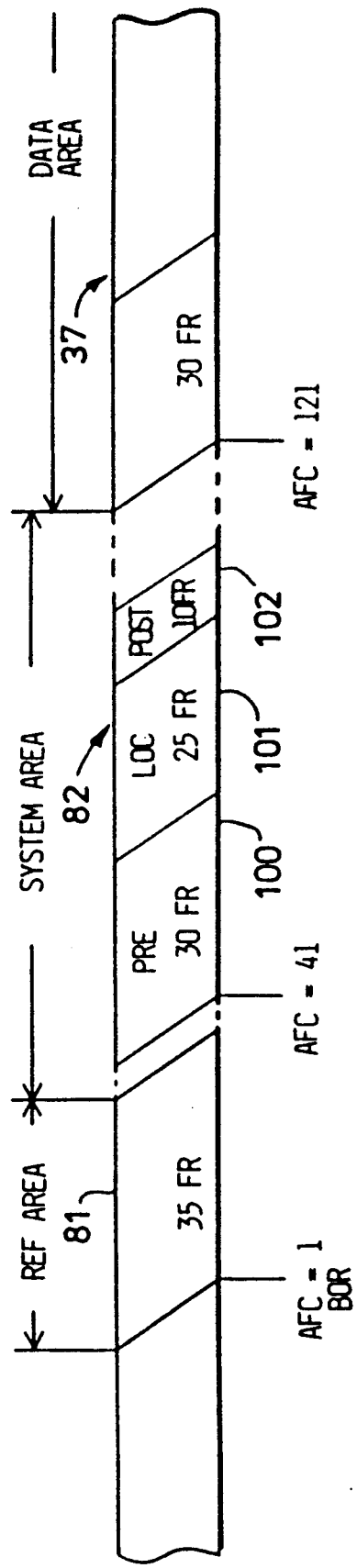
FIG. 7 is an expanded view of a system area of tape shown in FIG. 5.
Figure 6:
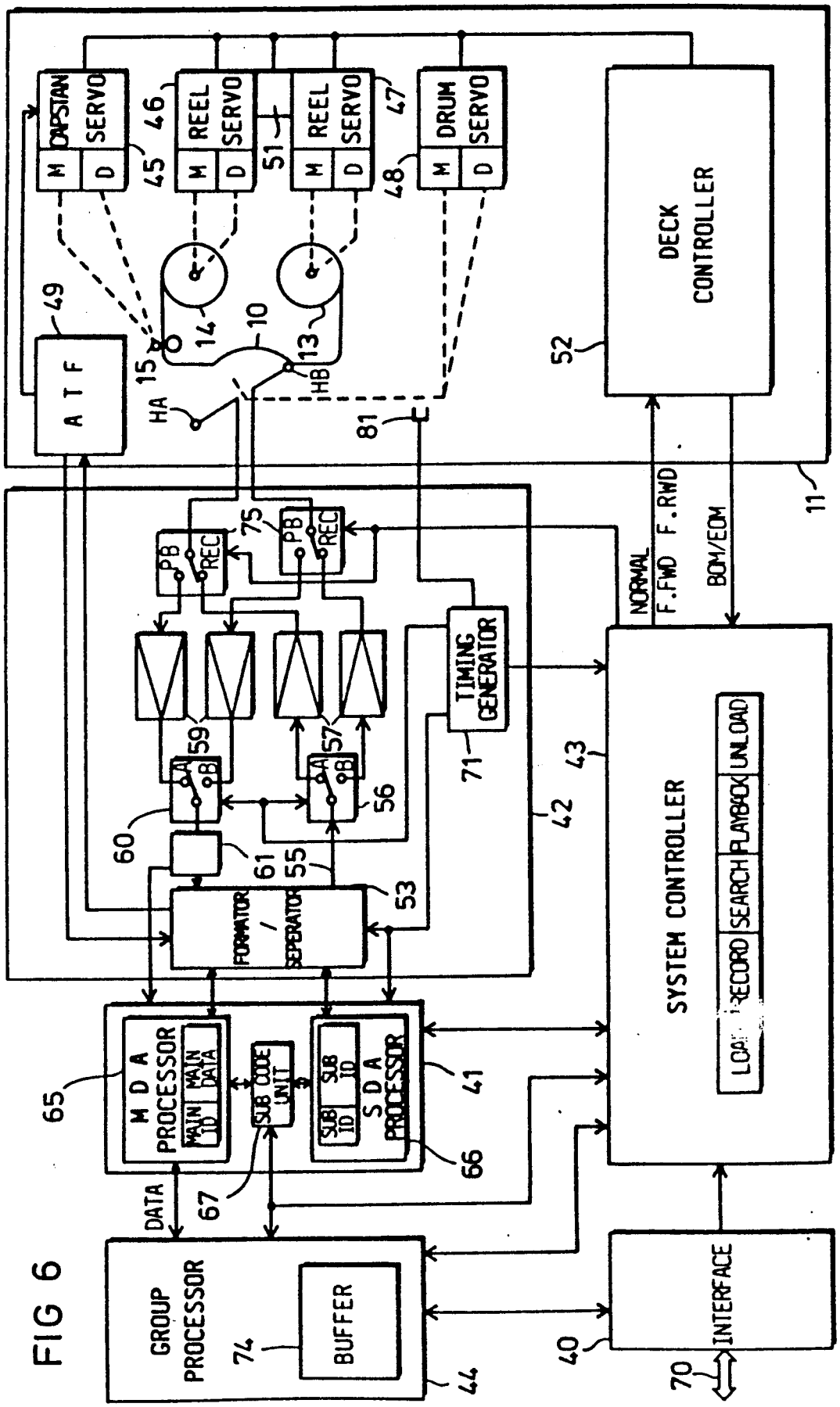
FIG. 6 is a block diagram of the main components of the data storage apparatus.

Having described the general form of the tape storage apparatus, the operation of storing tape usage data to the system area of the tape at the end of each session of tape usage will now be explained with reference to FIG. 7. However, before describing the operation in detail, a description will first be given with reference to FIG. 8, as to the general approach adopted here to effecting update in place for a helical scan recording format.

Figure 8:
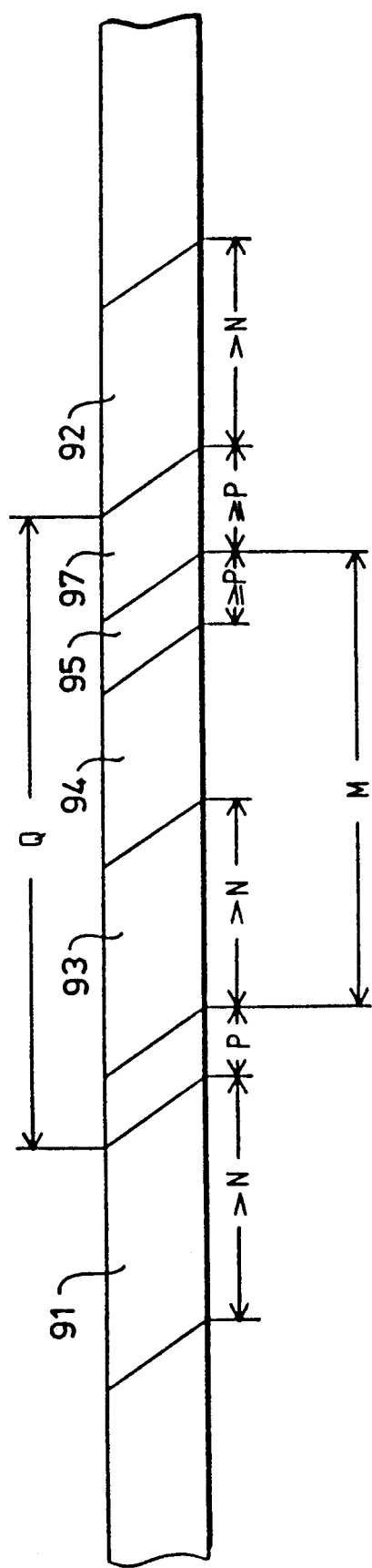
FIG. 8 is a diagram illustrating the arrangement of various groupings of tracks when effecting update-in-place in accordance with the present invention.

Shown in FIG. 8 is a tape to which first and second continuums of tracks 91, 92 have been written spaced by a distance corresponding to Q tracks. Each of these continuums comprises at least N tracks where N is the maximum number of tracks required for the ATF circuit to bring the head drum into tracking alignment. The value of Q can be set precisely by writing a continuous series of tracks comprising the first continuum 91, a desired number of intervening tracks (Q in number), and the second continuum 92. Alternatively, Q can be set approximately by writing the first continuum 91, moving the tape a predetermined distance within the accuracy limits of the deck, and writing the second continuum; in this case, the actual distance moved between the first and second continuum determines the value of Q.

The first continuum 91 includes data written to tracks after the first N tracks, that enables the last track of the first continuum to be identified when reading back the first continuum. This data is, for example a track (or frame) number recorded in each track (or in at least one track of a frame where frame numbering is used) and progressing in a predetermined sequence, such as rising in order from the first track of the continuum; alternatively, the last track (or frame) could be marked by an appropriate data flag.

Data that is to be updated repeatedly is then recorded in the gap between the first two continuums 91, 92, the data being included in a fixed-size block of M tracks made up of a first series of tracks 93 greater than N in number (for tracking alignment), a second series of tracks 94 in which the data is recorded, and a third series of blanking tracks 95.

At each writing, the block of tracks 93-95 is recorded by reading the first continuum 91 to identify the last track thereof, and then writing the block 93-95 as near as is practical to the end of the first continuum 91. In this respect, from the point of view of maximising the amount of data that can be written between the first and second continuums 91, 92, the block 93-95 would ideally be appended directly to the end of the first continuum; however, this would require costly and complex mechanisms and electronics and a more straight forward approach is to accept that a discontinuity will occur in switching from reading of the first continuum to writing the block 93-95. The precise location of the start of block 93-95 will vary within certain tolerance limits dependent on the particular characteristics of the tape storage apparatus. However, it is possible to determine (even, if only empirically) the maximum spread of the possible locations for the start of the block 93-95. Taking into account the desirability of providing some margin for safety, a maximum P can be determined on the spacing in terms of tracks of the start of the block 93-95 from the end of the first continuum; in FIG. 8, the block 93-95 is shown as having been written at this maximum spacing.

In practice, it is desirable to specify the values of P, and also of N, not on the precise characteristics of a particular piece of apparatus or even a particular design, but on a range of designs intended to be generally compatible. This, of course, means that in certain designs of apparatus there is an effective margin of safety in the values of P and N that is much greater than in other designs.

It will be apparent that the number of tracks M in the block 93-95 can be no more than $(Q-P)$ if the block is not to intrude into the second continuum 92. Since there must be more than N tracks in the first series 93 of tracks in block 93-95, the number of tracks in the remainder of the block must be less than (Q-P-N). For reasons to be discussed below, the number of tracks in the third series 95 should be at least P; it therefore follows that for there to be any data-bearing tracks, that is, tracks in the second series 94, the value of Q must be greater than $(2P+N)$.

The reason for there needing to be at least P blanking tracks in the third series 95 is to facilitate repeated re-writing of the block 93-95. More particularly, the provision of P tracks 95 ensure that regardless of the start of block 93-95 within the range zero to P tracks following the first continuum 91, the data contained in the second series of tracks 94 of a previously written block will always be obscured by the newly written block.

In order to provide a safety margin to ensure that the block 93-95 does not intrude on the second continuum 92, it is desirable to provide for a buffer zone 97 of at least P tracks between the end of the block 93-95 and the continuum 92. This can be achieved by ensuring that Q has a value at least equal to $(M+2P)$.

In practice, a desired size would be decided upon for the data area (that is, the second series of tracks 94) in the block 93-95 from which the overall size M of the block could be determined. This block size would then be used to determine the number of tracks Q needed between the first and second continuums 91,92. These continuums would then be recorded in one of the ways already described. Thereafter, the block 93-95 could be written as many times as desired. In fact, the first writing of the block 93-95 could be effected when writing the first and second continuums, these latter and the block being written in one continuous pass with the insertion of as many blank tracks as necessary.

Although the foregoing description of an update-in-place operation has generally been made with reference to the number of tracks involved, it will, of course, be appreciated that the description remains valid even though tracks may always be written in pairs constituting frames.

Returning now to a consideration of the updating of tape usage data stored in the system area 82, this operation is effected in accordance with the update-in-place method described with respect to FIG. 8 with the system area 82 corresponding to the area extending between the first and second continuums 91, 92 of FIG. 8, the reference area 81 corresponding to the first continuum 91, and the first tracks of the data area 37 corresponding to the second continuum 92. The tape usage data is written into the system area in a system block composed of a preamble 100, the previously-mentioned log area 101, and a blanking post-amble 102 (respectively corresponding to the first, second and third series 93, 94, 95 of FIG. 8). The sub codes holding the tape usage data are stored in the sub areas of each track in the log area 101.

In the present example, the maximum number of tracks N required to achieve tracking alignment is taken as sixty (thirty frames) while the value of P is taken as twenty tracks (ten frames). On this basis, the reference area 81 is given a length of thirty-five frames, the pre-amble 100 a length of thirty frames, the log area 101 a length of twenty five frames, and the post-amble 102 a length of ten frames. The spacing Q of the reference and data areas 81, 37 is made eighty five frames thereby providing a buffer of at least ten frames between the post-amble 102 and the data area 37.

The frames are given an absolute frame count (AFC) number which as already mentioned is stored as a sub code in the third pack of every block in the Sub Areas of every track. The first frame of the reference area has an AFC of one while the last frame of the reference area has an AFC of thirty five. The first frames of the pre-amble 100 and data area 37 have respective AFCs of forty one and one hundred twenty one.

When a tape is first loaded into the apparatus, the system controller 45 carries out a Load operation. The Load operation includes an initial check to determine if the tape contains existing data or is blank; this check is carried out by attempting to read the tape at a position beyond the expected location of BOR. In the event that the tape is determined to be a blank one, the controller 43 zeroes the data in the tape usage memory 68; thereafter the tape is moved to a predetermined location (spaced, for example, by a preset amount from BOM) and then, in one continuous pass, the following frames are written: the reference area frames 81, five amble frames, the pre-amble frames 100, the log area frames 101, the post-amble frames 102, fifteen amble frames, and a first data-area group preceded by thirty amble frames. In the process, the zeroed tape usage data in the memory 68 is written to the Sub Area blocks of the log area 101. In addition, an absolute frame count sub code is recorded in each track as well as Area ID sub code. The first frame of the reference area constitutes BOR.

During the remainder of the usage session initiated by loading the tape, the tape usage data in the memory 68 is appropriately updated. At the end of the session, when the controller 43 is instructed to unload the tape, the controller 43 positions the tape at the beginning of the reference area (for example, by returning to BOM and then advancing while reading the tape). The controller then reads through the reference area 81 until it identifies the last frame (frame thirty five) by its absolute frame count sub code. Next, the controller 43 initiates writing of the system block composed of the preamble 100, log area 101, and post-amble 102, this block having a start location within ten frames of the end of the reference area. The log area tracks are written with the tape usage sub codes derived from the memory 68.

Upon next loading of the tape, the controller 43 again checks to see if the tape carries data and this time the check produces a positive result. The controller 43 now proceeds to return to BOR and to read the reference area followed by the system area. The identification of the system area frames is facilitated by the provision of the Area ID sub code in these frames. The tape usage data, contained in the log area sub codes is stored in the memory 68. As already mentioned, the multiple storage of the tape usage sub codes in the frames of the log area, greatly improves the likelihood of recovering an error-free copy of these sub codes.

As before, during the remainder of the tape usage session, the usage data in the memory 68 is updated as appropriate, the updated information being written to tape at the end of the session in the manner already described.

What is claimed is:

1. A method of storing data on a recording tape and of subsequently updating that data, said method employing helical scan recording in which data is written in oblique tracks and a head tracking alignment technique is used that enables tracking alignment to be achieved after a maximum number of N tracks where N>0, characterized in that said method comprises the steps of:
    (a) writing a first and a second continuum of tracks each containing more than N tracks in number and being separated from each other along the tape by a number of tracks Q, the last track of said first continuum being identifiable by data recorded in that continuum beyond the first N tracks thereof,
    (b) subsequently writing data to tape in a block of M tracks made up of a first series of tracks greater than N in number, a second series of tracks containing said data, and a third series of blanking tracks, the operation of writing said block involving the steps of reading said first continuum to identify the last track thereof, and writing said block as a continuum of tracks starting at a location positioned beyond said last track of the first continuum by up to P tracks, said third series of tracks being at least P in number,
    (c) repeating step (b) each time it is desired to update the data held in said block,
the values of N and P being predetermined and the maximum value of M being set by the value of the quantity (Q−P), and step (a) being such that the inequality Q>(N+2P) is satisfied.

2. A method according to claim 1, wherein said first and second continuums of tracks are written in a single continuous series together with Q intervening tracks.

3. A method according to claim 1, wherein the starting location for said second continuum is determined by determining the displacement of the tape in moving the latter on from the first said continuum.

4. A method according to claim 1, wherein said data recorded in said first continuum to enable identification of the last track thereof, are numbers recorded in at least some of said tracks and progressing according to a predetermined sequence.

5. A method according to claim 1, wherein the number of tracks M in said block is less than Q by at least 2P whereby a distance of at least P tracks is present between the end of said block and the start of said second continuum of tracks.

6. A method according to claim 1, wherein for a DAT-type system, the following values are given to M, N, P and Q:
M = 130 tracks
N = 60 tracks
P = 20 tracks
Q = 160 tracks 7. A method according to claim 1, wherein the data stored in said block is tape usage data, said block being written at the end of a tape usage session.

8. A method according to claim 7, wherein each track is formatted to have a main area for storing user data and at least one sub area for storing auxiliary information relating to said user data, said tape usage data being stored in its totality in the said at least one sub area of each track of said second series of tracks of said block.

* * * * *